US011718504B2

(12) United States Patent
Germain et al.

(10) Patent No.: US 11,718,504 B2
(45) Date of Patent: Aug. 8, 2023

(54) INERTIAL ANALYZER FOR VERTICAL MINING CONVEYANCES AND METHOD THEREOF

(71) Applicant: HIS MAJESTY THE KING IN RIGHT OF CANADA, AS REPRESENTED BY THE MINISTER OF NATURAL RESOURCES, Ottawa (CA)

(72) Inventors: Yan Germain, Val-d'Or QC (CA); Daniel Côté, Val-d'Or QC (CA); Louis Germain, Val-d'Or QC (CA)

(73) Assignee: HIS MAJESTY THE KING IN RIGHT OF CANADA, AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 370 days.

(21) Appl. No.: 16/884,705

(22) Filed: May 27, 2020

(65) Prior Publication Data

US 2020/0377335 A1 Dec. 3, 2020

Related U.S. Application Data

(60) Provisional application No. 62/853,234, filed on May 28, 2019.

(51) Int. Cl.
*B66B 5/06* (2006.01)
*B66B 1/34* (2006.01)
(Continued)

(52) U.S. Cl.
CPC .............. *B66B 5/06* (2013.01); *B66B 1/3492* (2013.01); *B66B 5/0031* (2013.01); *B66B 19/06* (2013.01)

(58) Field of Classification Search
CPC ........... B66B 9/00; B66B 7/02; B66B 1/3492; B66B 7/062; B66B 19/06; B66B 5/0037;
(Continued)

(56) References Cited

U.S. PATENT DOCUMENTS 4,535,541 A * 8/1985 Penning ................ B66B 7/1246 33/711
5,963,884 A 10/1999 Billington et al.
(Continued)

FOREIGN PATENT DOCUMENTS

AU 2016401400 B2 4/2018
AU 2017311429 B2 * 5/2020 ........... B66B 25/006
(Continued)

*Primary Examiner* — Marlon T Fletcher
(74) *Attorney, Agent, or Firm* — Collard & Roe, P.C.

(57) ABSTRACT

The present invention provides device system and a method for monitoring movements of mining conveyances in a mine shaft. One or more sensors that form part of the system may be installed directly on the mining conveyances. The sensors may be accelerometers and are for detecting movements on mining conveyances. The system may analyze the descent and ascent paths of the mining conveyances on guides by recording vertical, horizontal and transverse accelerations. The analysis may comprise associating the movements with position of the mining conveyances on the guides for identification of an anomaly at a specific position.

14 Claims, 12 Drawing Sheets

(51) Int. Cl.
*B66B 5/00* (2006.01)
*B66B 19/06* (2006.01)

(58) Field of Classification Search
CPC ..... B66B 5/0031; B66B 11/02; B66B 5/0006; B66B 5/0025; B66B 1/3446; B66B 13/143; B66B 3/002; B66B 5/06; B66B 17/26; B66B 11/08; B66B 11/04; B66B 11/0206; B66B 5/04; B66B 5/0093; D07B 2501/2007
See application file for complete search history.

(56) References Cited

U.S. PATENT DOCUMENTS

| | | | | |
|---|---|---|---|---|
| 7,099,782 | B2 | 8/2006 | Hitchcock et al. | |
| 7,406,399 | B2 | 7/2008 | Furem et al. | |
| 7,689,394 | B2 | 3/2010 | Furem et al. | |
| 9,242,836 | B2 * | 1/2016 | Cao | B66B 7/025 |
| 9,372,482 | B2 | 6/2016 | Rikkola et al. | |
| 9,903,090 | B2 * | 2/2018 | Daniel | G06F 11/30 |
| 2009/0248360 | A1 | 10/2009 | Garrison | |
| 2012/0065937 | A1 | 3/2012 | de Graff et al. | |
| 2016/0221591 | A1 | 8/2016 | Kuehbandner et al. | |
| 2017/0138193 | A1 | 5/2017 | Kawai et al. | |
| 2017/0308802 | A1 | 10/2017 | Ramsoy et al. | |
| 2017/0343451 | A1 * | 11/2017 | Yoshida | G01H 1/003 |
| 2018/0005461 | A1 | 1/2018 | Steketee et al. | |

FOREIGN PATENT DOCUMENTS

| | | | | | |
|---|---|---|---|---|---|
| CA | 2123127 | A1 | | 5/1993 | |
| CN | 103899327 | A | | 7/2014 | |
| CN | 203833410 | U | | 9/2014 | |
| CN | 204038802 | U | | 12/2014 | |
| CN | 204679194 | U | | 9/2015 | |
| CN | 105502118 | A | * | 4/2016 | B66B 11/043 |
| CN | 107131843 | A | | 9/2017 | |
| CN | 107651547 | A | | 2/2018 | |
| CN | 207123335 | U | | 3/2018 | |
| CN | 111819144 | A | * | 10/2020 | B66B 5/0006 |
| DE | 202008001786 | U1 | * | 1/2009 | B66B 1/3476 |
| DE | 102014101381 | A1 | * | 8/2015 | B66B 5/0093 |
| EP | 0178939 | A2 | | 4/1986 | |
| EP | 3730440 | A1 | * | 10/2020 | |
| GB | 924276 | A | | 4/1963 | |
| GB | 2005843 | A | | 4/1979 | |
| GB | 1585561 | A | * | 3/1981 | B66B 1/3492 |
| WO | 2016019431 | A1 | | 2/2016 | |
| WO | 2017222546 | A1 | | 12/2017 | |
| WO | WO-2018028989 | A1 | * | 2/2018 | B66B 25/006 |

* cited by examiner

INERTIAL ANALYZER FOR VERTICAL MINING CONVEYANCES AND METHOD THEREOF

RELATED APPLICATIONS

This application is a non-provisional patent application which claims the benefit of U.S. provisional application No. 62/853,234 filed on May 28, 2019.

TECHNICAL FIELD

The present invention relates to monitoring technologies. More specifically, the present invention relates to the monitoring of conveyances in mine shafts to thereby identify anomalies.

BACKGROUND

A mine shaft is a vertical tunnel dug to access and exploit subsoil mining resources. The shaft thus created can reach more than 2134 m. deep and is typically divided into several compartments to allow the movement of workers, ore, and equipment at the different levels of the mine. An exemplary mine shaft is shown in FIG. 1A. Transport equipment, herein called mining conveyances, moves vertically in these compartments at variable speeds on guides, the guides being typically wood, steel, or cable guides. In particular, mining conveyances may be sets of cages and skips, skips and counterweights, service cages, or cages dedicated to the transport of workers. Sets equipped with skips are used for hoisting ore to the surface and normally work in double drum with a skip being loaded while another is being emptied into a bin at the surface. The service cage is used to transport workers, equipment, and materials into and out of the mine. The auxiliary cage also allows the transportation of personnel in addition to serving as an emergency transport. An exemplary setup of mine shaft for the conveyances is shown in FIG. 1B. Mining conveyances in an underground mine shaft are sometimes the main access into the mine and are essential for the productivity of the mine.

During normal operation, the moving speed of the conveyances causes vibration and wear on the guides. The wear and vibrations may produce misalignments between the guides and may cause knocking at various places over time. Repeated knocks at the same place may increase depending on use, and may thus damage the mine shaft components. Currently, no system exists that allow for the quick and accurate detection of anomalies that could develop on the fixed guides. Currently, a cage attendant who spends most of his or her time in the cage is the only reference that confirms when an important knock starts to develop at a specific position in the shaft.

While damage to guides is an important operating parameter that maintenance workers monitor to prevent mechanical failure, misalignment of guides is a more difficult issue to assess. In extreme conditions, lateral impact due to misalignment of guides could cause injury to workers.

Mining regulations require mining companies to visually inspect each shaft compartment once a week in addition to a thorough inspection once a month. Inspections are usually carried out by workers on the roof of the conveyance. The workers must visually inspect the entire length of the shaft at a reduced speed. As the speed of the conveyance is closely related to the strength of the knocking, a low speed inspection does not reflect knocks or impacts felt at normal speed. Such inspections are very subjective, relying essentially on the judgment of the worker conducting the inspection. Moreover, each mine may have different inspection criteria.

In view of the above, there is a need for proper instrumentation and method for monitoring the conveyance movement in a mine shaft. In particular, there is a need for instrumentation for continuous shaft monitoring so that mining operators can be warned when the level of knocking exceeds an acceptable threshold.

SUMMARY

The present invention provides systems and methods for monitoring the movement of conveyances in a mine shaft. The system includes at least one sensor that may be installed directly on the mining conveyances deployed in the mine shaft. The system may include sensors, such as accelerometers, for detecting unusual or unexpected movement on the mining conveyance. The system analyzes the descent and ascent paths of the mining conveyance on guides analyzing recorded vertical, horizontal and transverse acceleration data from sensors. Continuous data analysis allows abnormal impacts to be associated with vertical positions in the shaft where these impacts are felt. The information provided by the system will help maintenance persons in tracking these impacts while they are still below a tolerable threshold. In addition, the information collected by the system allows for targeted preventive maintenance planning and can be used to make visual inspections much more accurate.

In a first aspect, the present invention provides a method for monitoring movements of at least one mining conveyance in a mine shaft for identifying anomalies, the at least one mining conveyance being vertically displaceable along guides in the mine shaft, the method comprising:

providing the at least one mining conveyance with at least one sensor for detecting movements;

operating the at least one mining conveyance upwardly and downwardly along the guides;

detecting movements with the at least one sensor to generate a signal;

analyzing the signal as a function of position of the mining conveyance on the guides for identification of an anomaly at a specific position.

In a second aspect, the present invention provides device system for monitoring movements of at least one mining conveyance in a mine shaft for identifying anomalies, the at least one mining conveyance being vertically displaceable along guides in the mine shaft, the system comprising:

at least one sensor provided on the at least one mining conveyance for detecting movements and generating a signal; and a processor for analyzing the signal and identifying an anomaly as a function of a specific position of the at least one mining conveyance on the guides.

BRIEF DESCRIPTION OF THE DRAWINGS

The present invention will now be described by reference to the following figures, in which identical reference numerals refer to identical elements and in which:

FIG. 4A is the graph for Example 1; FIG. 4B is the graph for Example 2 and FIG. 4C is the graph for Example 4

FIG. 5A is the graph for Example 1; FIG. 5B is the graph for Example 2 and FIG. 5C is the graph for Example 4

FIG. 6A is the graph for Example 1; FIG. 6B is the graph for Example 2; and FIG. 6C is the graph for Example 4

DETAILED DESCRIPTION

The present invention provides a method for monitoring movements of a conveyance in a mine shaft and a system for use in conjunction with the method. The method and system may be used as work tools for mine shaft maintenance people. A mine shaft must contain at least two compartments separated by a partition, one of which is used to evacuate personnel in case of emergency. The compartments of a mine shaft are divided according to the conveyances used and may include: service cages, auxiliary cages, sets of skips, etc. The auxiliary cage is usually used for daily operations and staff travel only. The mine conveyances are mounted on vertical guides and are operated for upward and downward motion inside a mine shaft that is used for exploiting mining resources. The method and system of the present invention allow for the monitoring of movements of mining conveyances along the guides of the mine shaft and the data obtained can be analyzed for the identification of anomalies. The method and system may allow for targeted preventive maintenance of the mine shaft and to thereby reduce the risk of an accident. The method and system may also generate an emergency alert or order emergency stops. The security and efficiency of mine shafts may thus be increased using this method and system.

One or more objects of the invention may be achieved with a system having a component installed directly on the mining conveyances. The component may include sensors, such as accelerometers, for detecting movements of the mining conveyances. The method may be practiced in conjunction with the system. The system and method allow for the monitoring of movement of conveyances in the mine shaft and for identifying anomalies or faults that may appear. The method may comprise operating the mining conveyance and analyzing the descent and ascent paths of the mining conveyances on the guides by detecting and recording accelerations in the vertical, horizontal, and transverse directions. The method and system may continuously detect movements and analyze data to allow abnormal impacts to be associated with vertical positions in the mine shaft where these impacts are detected. The analysis may comprise comparing the detected movements with a predefined acceptable threshold. Preferably, the method may be conducted continuously when the conveyances are in operation in the mine shaft, and the analysis may be conducted in real time. The information provided by the method and system may assist an operator during operation of the conveyances and may be of use when planning preventive maintenance in a specific area of the mine shaft. In addition, the information collected by the method and system may allow for controlling the speed of the mine conveyances in areas identified as problematic or the method and system may be useful in automatically causing an emergency stop of the conveyance in extreme situations.

Figure 1A:
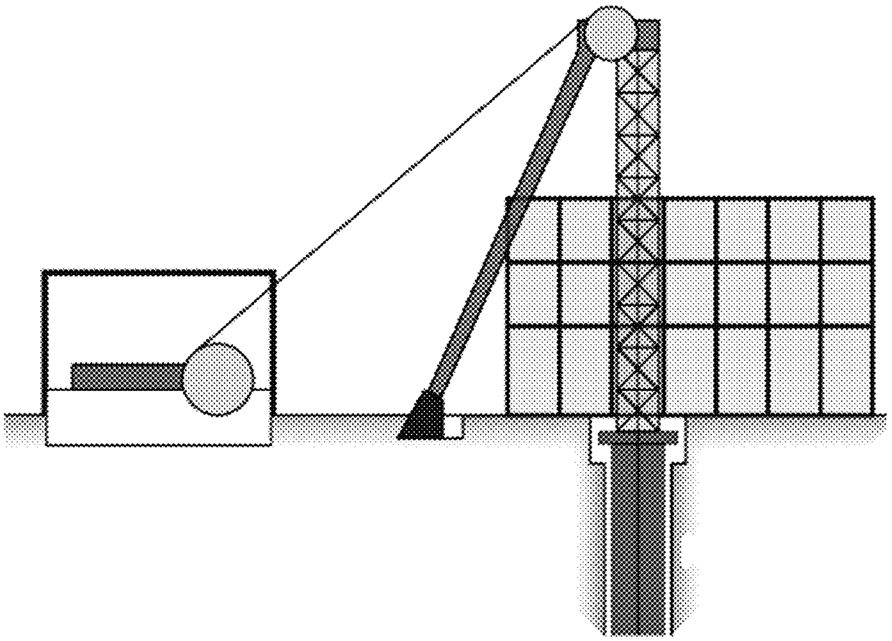
FIG. 1A is a schematic drawing of a mine shaft according to prior art.
Figure 1B:
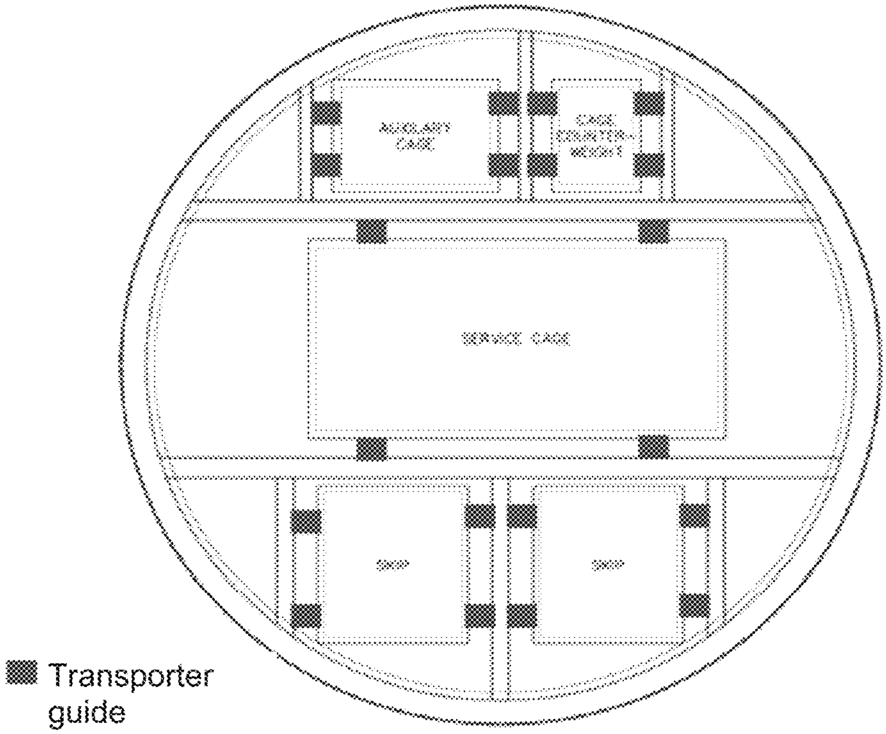
FIG. 1B is a schematic drawing of a sectional view along the A-axis of the mine shaft of FIG. 1A.
Figure 2:
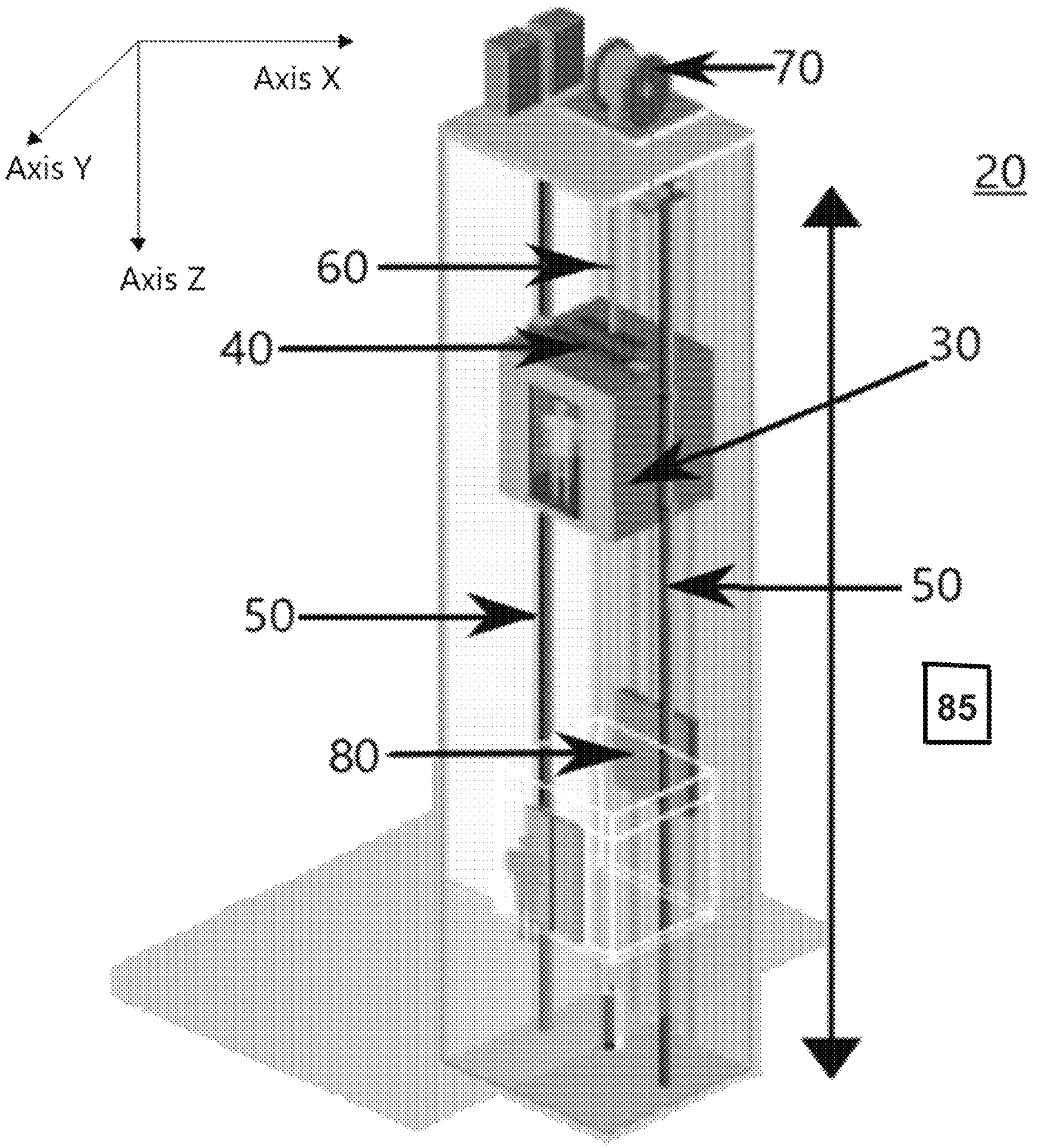
FIG. 2 is a schematic drawing of an embodiment of the present invention, including a representation of the reference axes.
Figure 3:
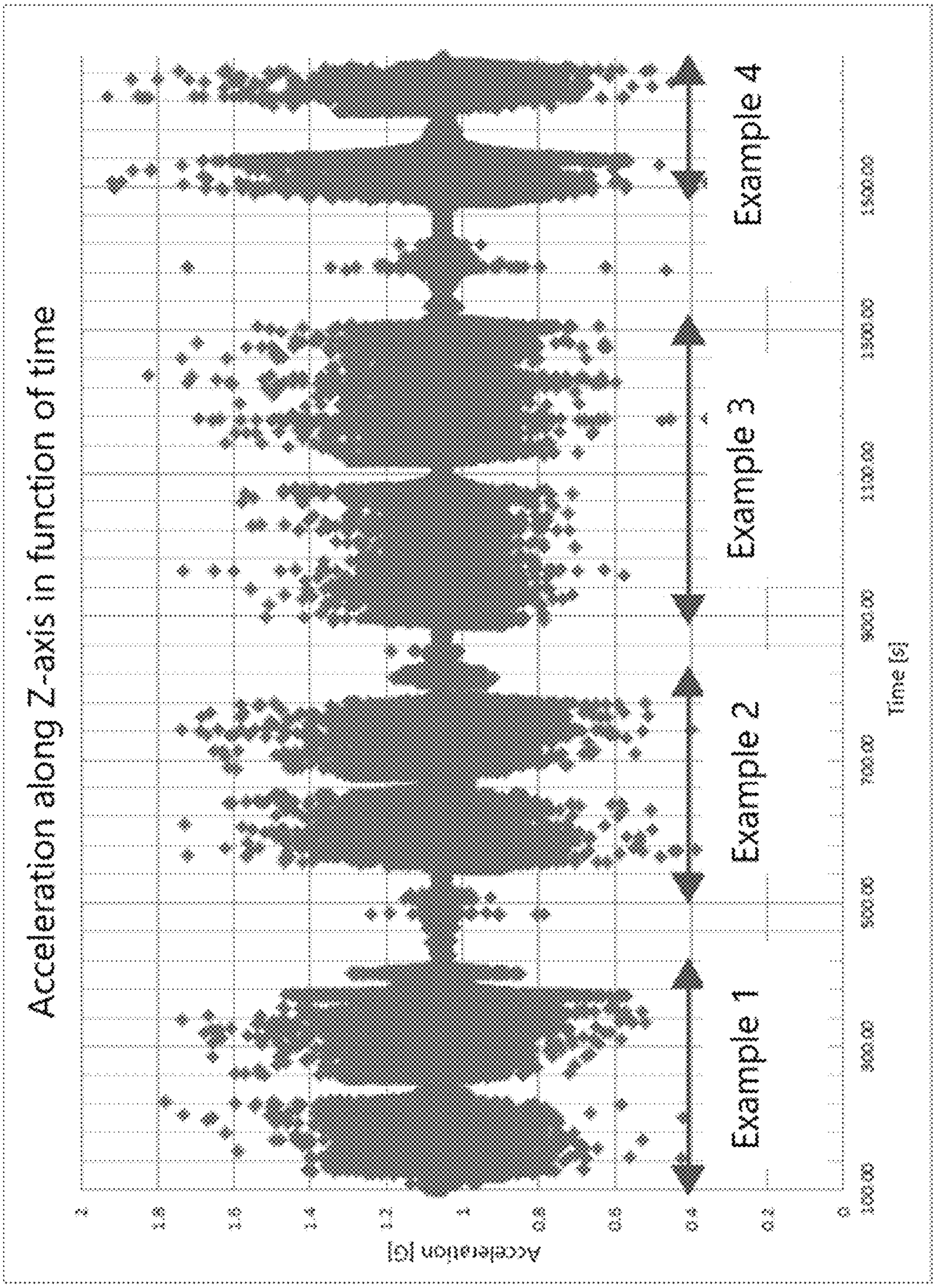
FIG. 3 is a graph of the detected accelerations along the z-axis as raw data as a function of time according to exemplary embodiments of the present invention.
Figure 4A:
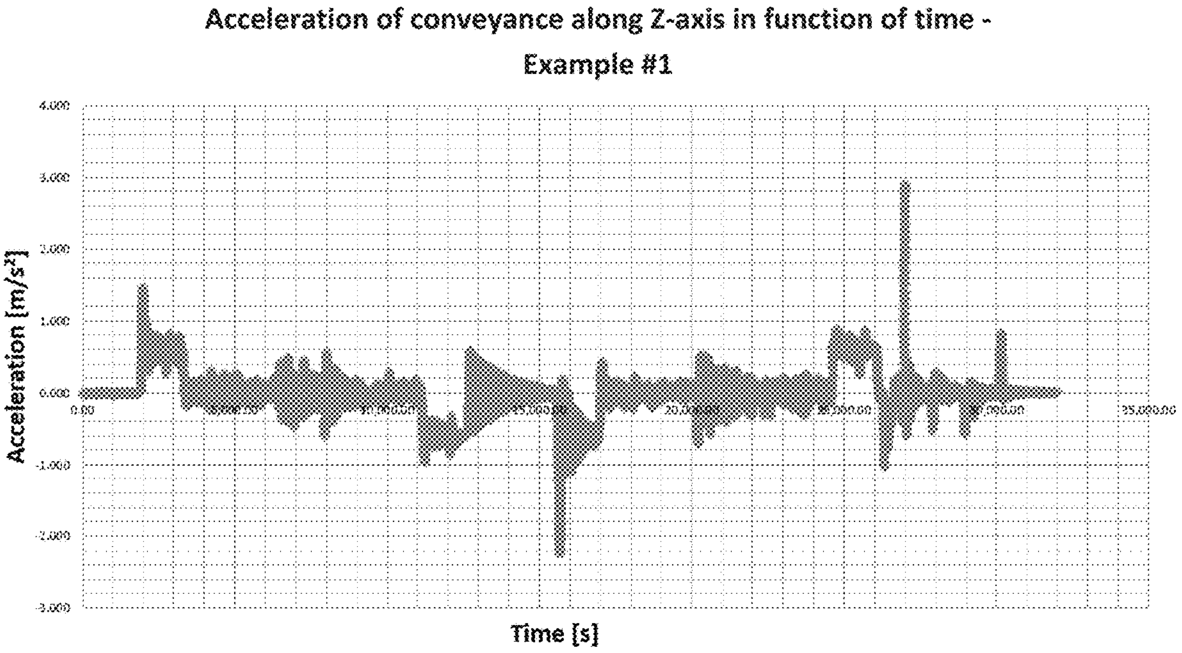
FIGS. 4A-4C are graphs of the detected accelerations as a function of time according to exemplary embodiments of the present invention.
Figure 4B:
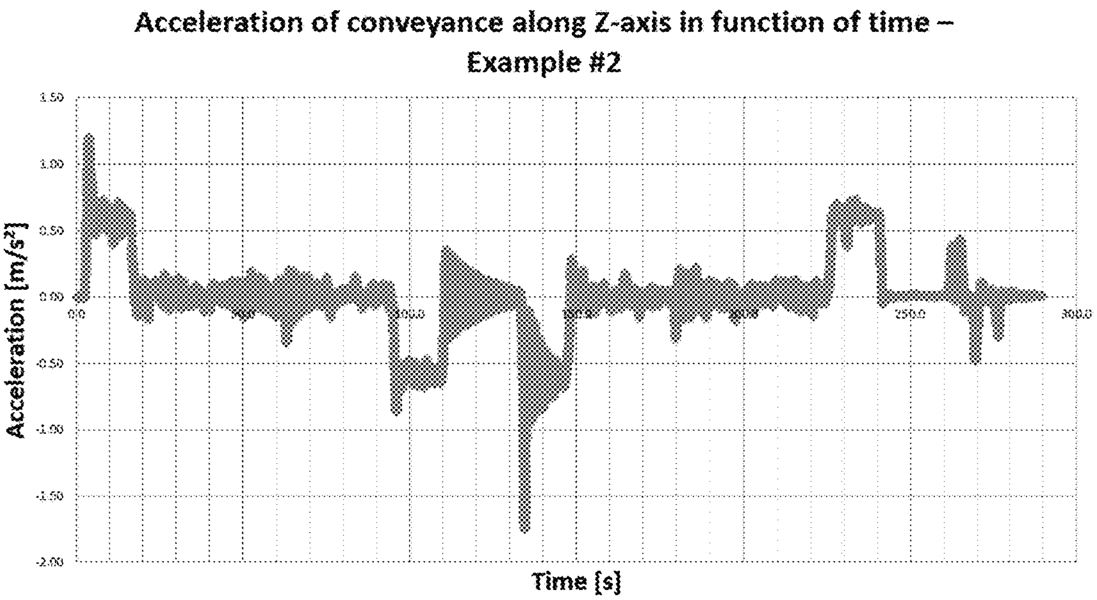
Figure 4C:
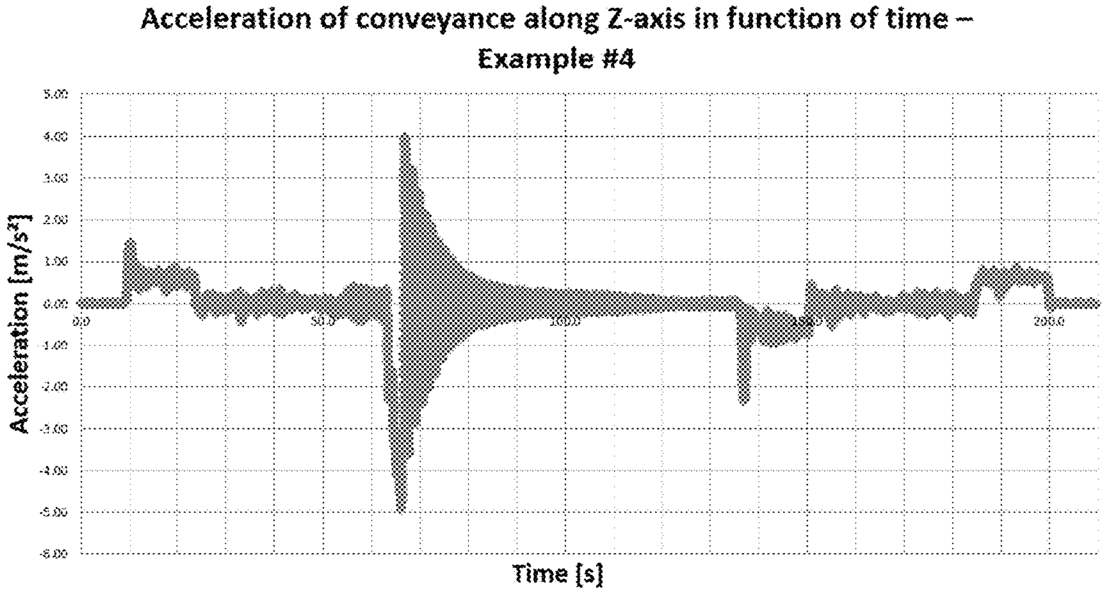
Figure 5A:
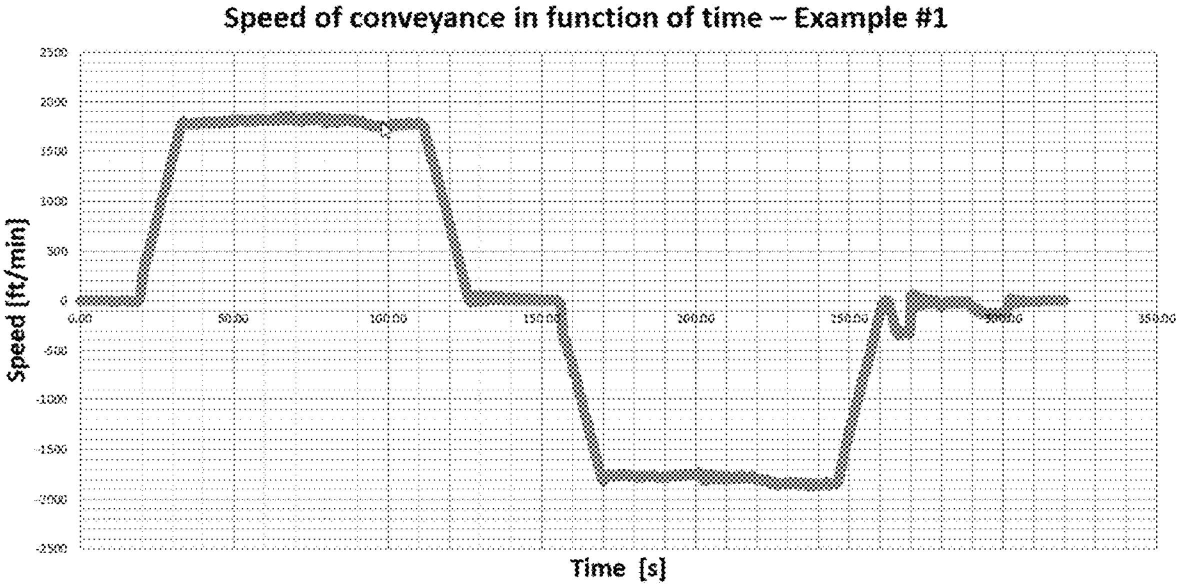
FIGS. 5A-5C are graphs of the speed as a function of time according to exemplary embodiments of the present invention.
Figure 5B:
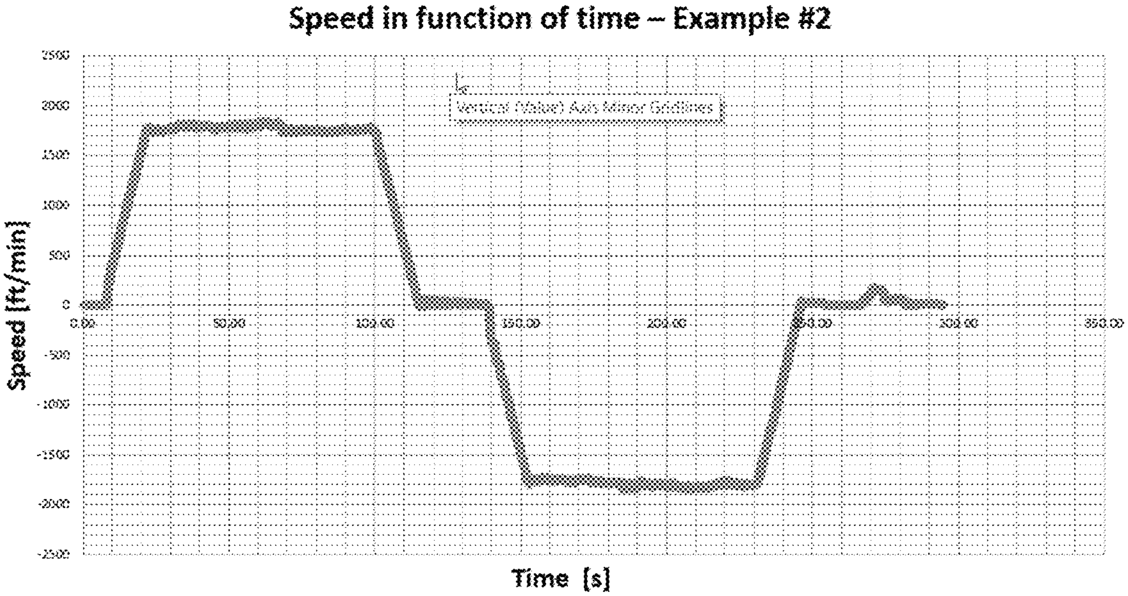
Figure 5C:
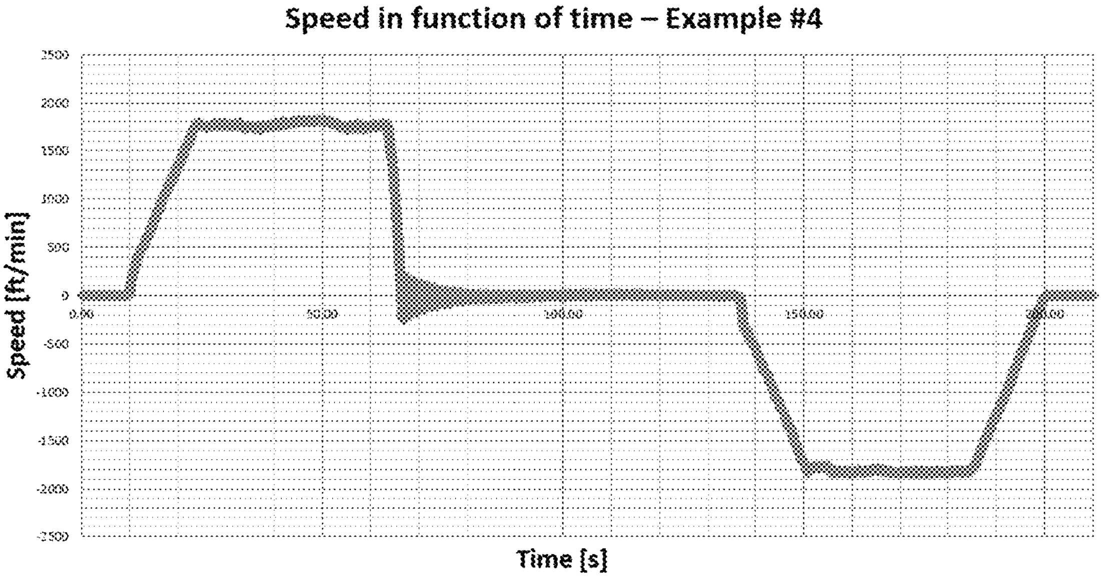
Figure 6A:
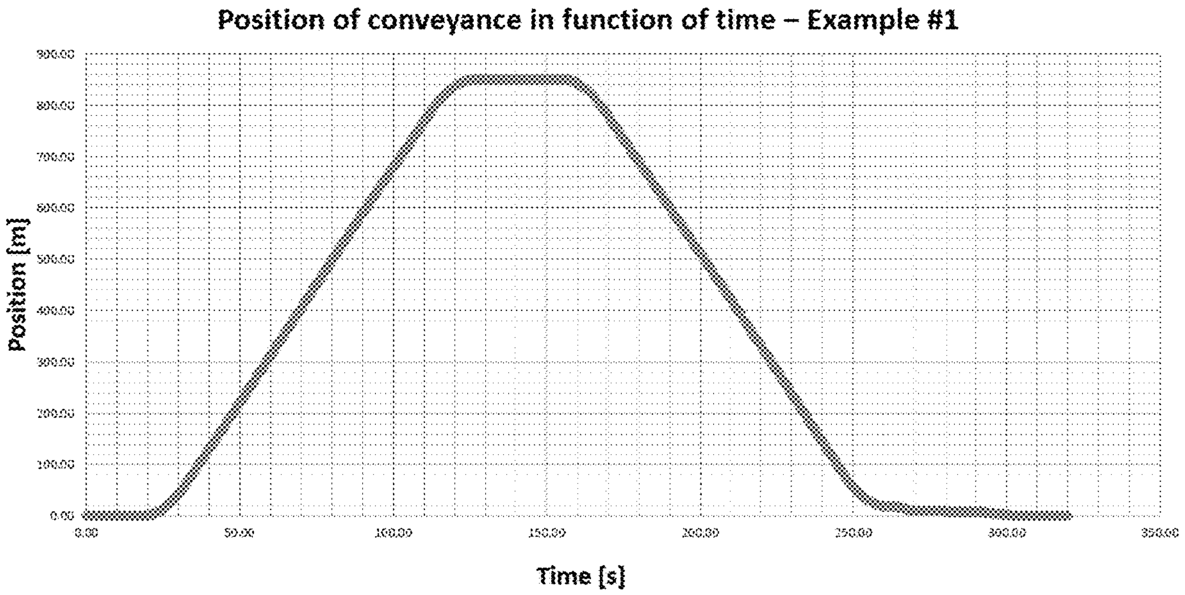
FIGS. 6A-6C are graphs of the displacement of the mine conveyance as a function of time according to exemplary embodiments of the present invention.
Figure 6B:
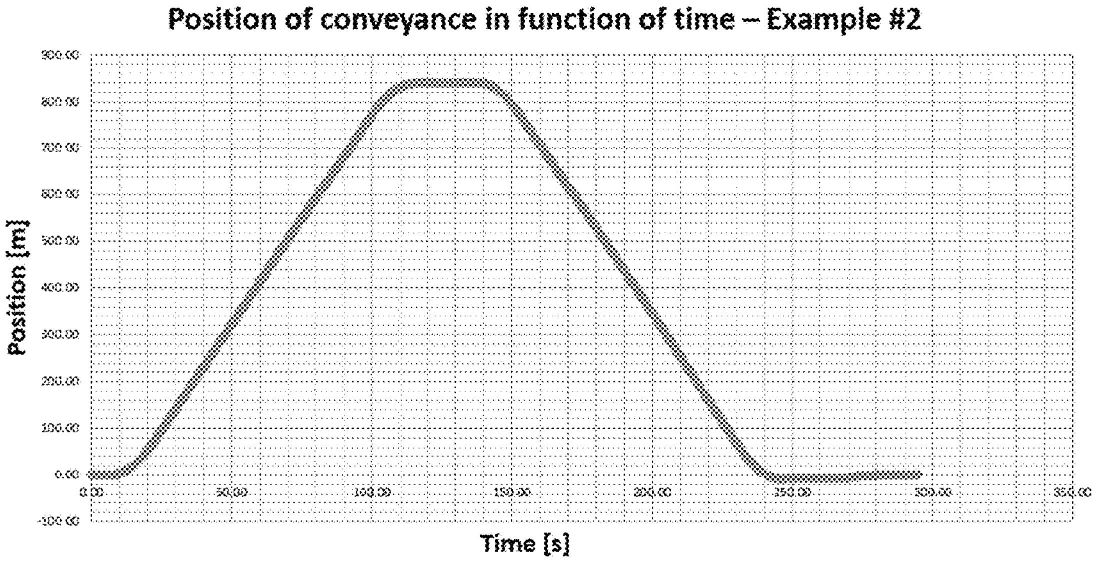
Figure 6C:
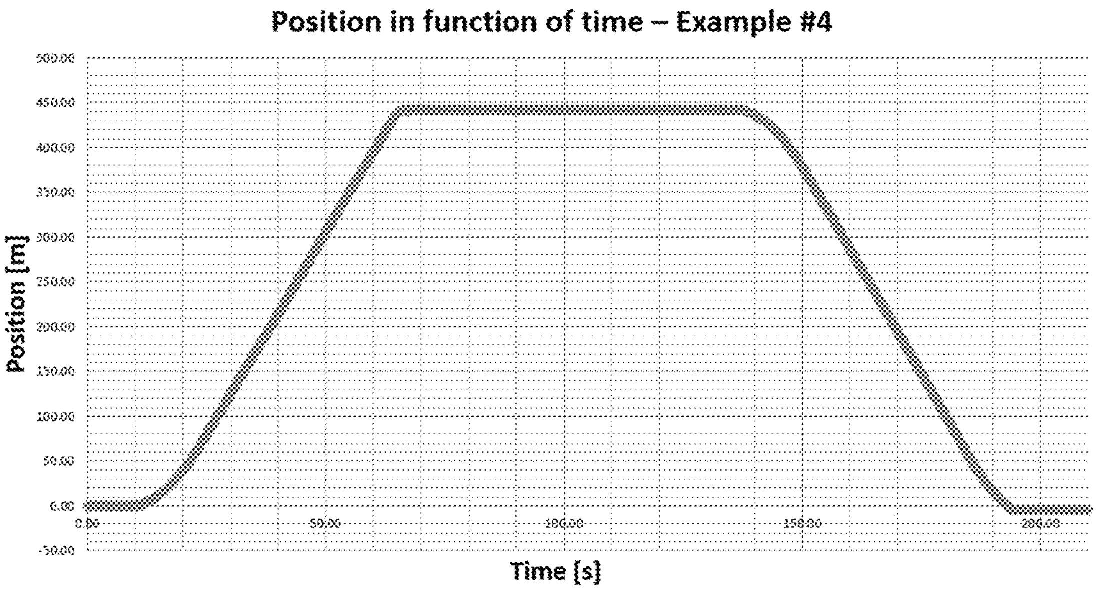
Figure 7A:
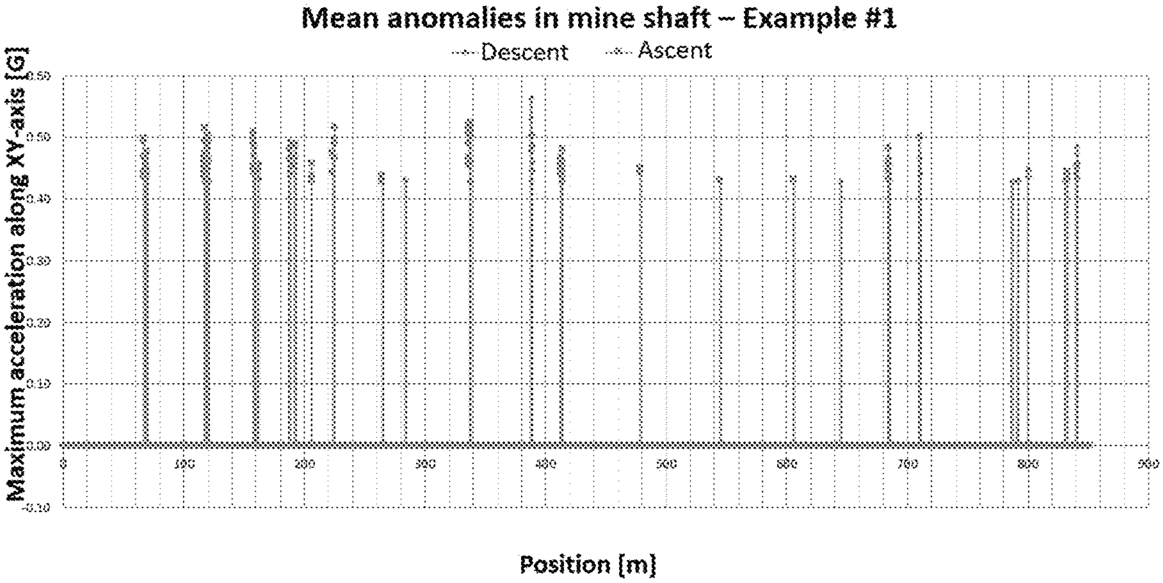
FIGS. 7A-7C are graphs of the detected accelerations associated with the position of the mine conveyance according to exemplary embodiments of the present invention; 7A is the graph for Example 1; 7B is the graph for Example 2 and 7C is the graph for Example 4
Figure 7B:
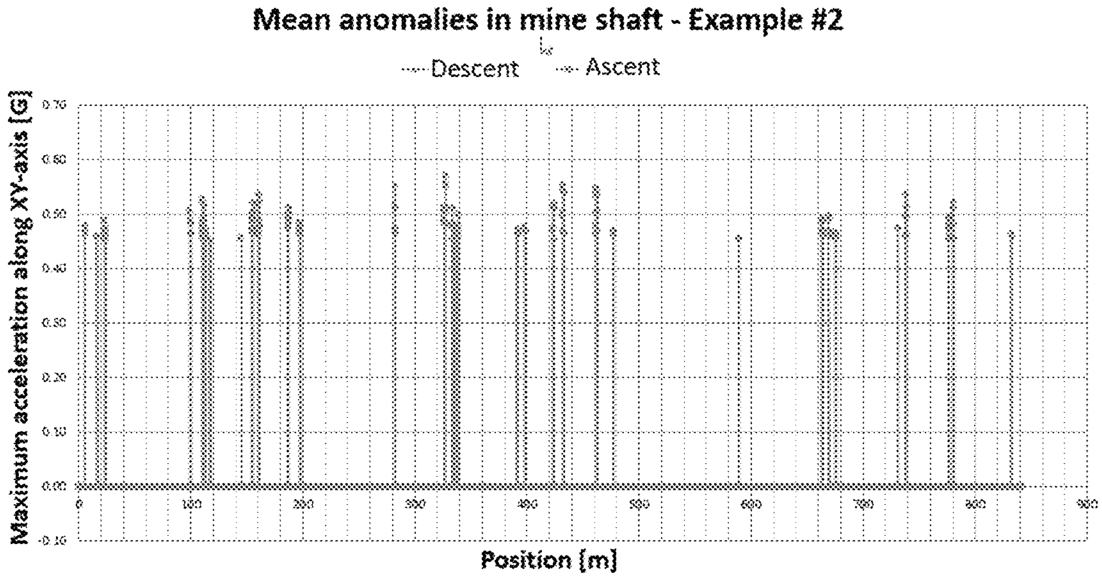
Figure 7C:
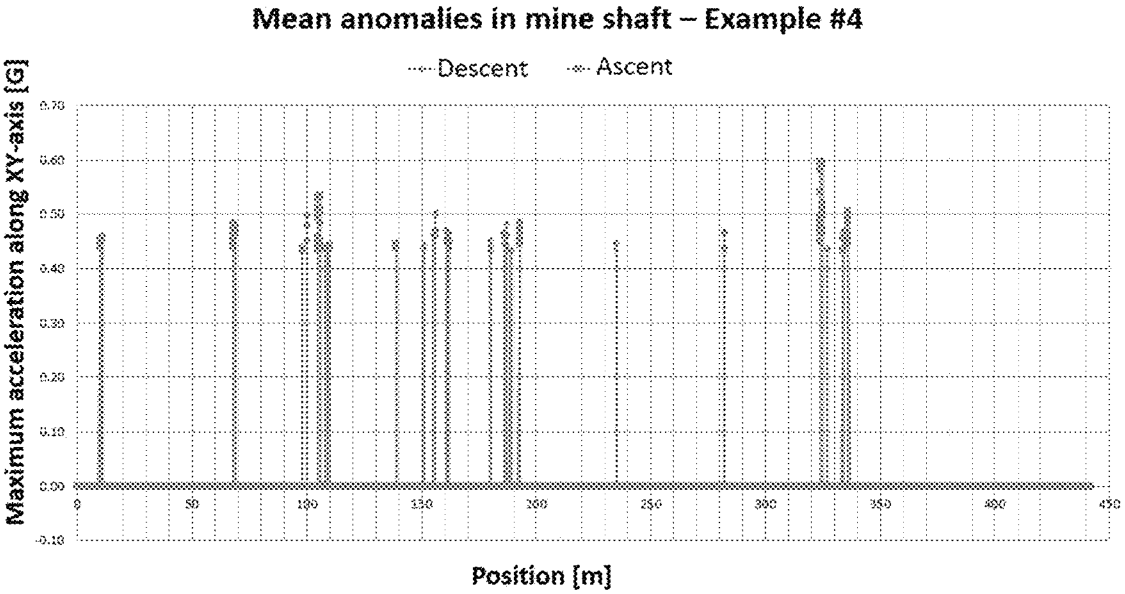

Referring now to FIG. 2, an elevator shaft 20 is shown as an analogue to a mine shaft of the present invention. The conveyance 30 is provided with sensors 40. The conveyance 30 is vertically displaceable along guides 50. A steel rope 60 is also shown going through a winch 70 for operatively moving the conveyance 30 up and down along the guides 50. A counter-weight 80 may also be provided. The method of the present invention may be carried out using the exemplary environment shown in FIG. 2. As can be seen, the environment includes the conveyance 30 in a mine shaft. The method may comprise operating the conveyance 30 to move upwardly and downwardly along the guides 50, and the sensors 40 are used to detect movements on the conveyance 30. The impact or knocks may be associated with a position along the guides 50 and analyzed to thereby identify an anomaly at a specific position along the guides 50 inside the shaft 20. A processing device/processor 85 receives data from the sensors 40 and, based on this data, analyzes to determine where the impacts or knocks are located as a function of the location of the conveyance in the shaft.

The method and system may detect movements when the mining conveyances are in operation and the movements are recorded as signals. Upon the detection of an impact or knock, the position of the conveyance is noted and recorded, and the signal is associated with the conveyance position when the impact was detected and recorded. These knock signals may then be transmitted by a transmitter to the suitable processor 85 for analysis.

In one implementation, abnormal impacts, such as knocks, are determined when the signal analyzer (a part of the processor) determines the presence of an acceleration, on the XY plane, that exceeds a confidence interval of 95% of the accelerations normally observed during the movement of the conveyance or when the acceleration exceeds the tolerance threshold fixed by the operator. The position, speed, and acceleration of the conveyance, as well as the impact on the XY plane, are calculated by the signal analyzer and recorded in an anomaly report. The anomaly report contains all the abnormal impacts measured by the signal analyzer between the time that the conveyance leaves the surface and the time the conveyance returns to the surface. The anomaly report is transmitted by a transmitter to the conveyance's control station each time the conveyance rises to the surface. The transmitter can be any transmitter known in the art, and is, preferably, a wireless transmitter. After the knock signals have been transmitted, the processor can then analyze the signal associated with a specific position of the mine conveyance and can then identify anomalies as a function of the specific position of the mine conveyance along the guides.

This identified data can be output to or included in the anomaly report. The anomaly report can be output to a display device in the control station and the operator can modify the operation of the carriers according to the results of the anomaly report. As well, the processor can be connected to a display device and the display device can be used to display the analysis results, which may include the anomaly report.

Figure 8:
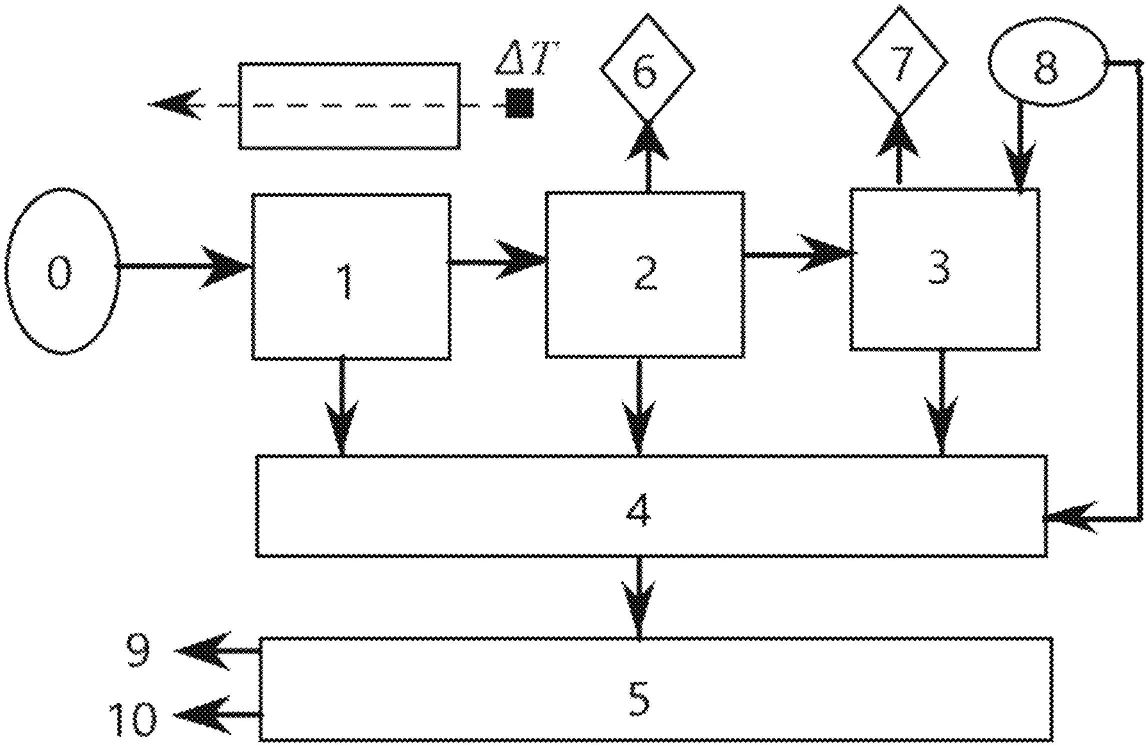
FIG. 8 is a mixed functional block diagram/flowchart detailing functional blocks and their functions in a method according to an exemplary embodiment of the present invention.

The data analysis may be carried out according to different steps in a procedure executed by the processor. A block diagram of an exemplary analysis method executed by the processor is illustrated in FIG. 8. The analysis steps and the input and output parameters of the analysis method are illustrated. According to the present invention, the accelerometers continuously measure the accelerations felt in the conveyance along the X, Y, and Z axes, as illustrated in FIG. 2. The method may adjust the reading frequency of the sensors to accurately and instantly measure the accelerations fell in the conveyance during maximum displacement in the mine shaft. The method may adjust the reading frequency depending on the type of conveyance.

Referring to FIG. 8, a schematic functional block diagram detailing a method executed by a processor according to one aspect of the invention is illustrated. At step 0, accelerations along axes X, Y, and Z are measured as a function of time. The accelerations are acquired with an acquisition frequency sufficient to detect all the impacts on the conveyance when it is ascending and descending. Functional block 1 calculates the weighted average of the accelerations on the XY plane and the Z axis, according to a time interval adjustable by the program. These weighted averages make it possible to determine whether the conveyance is in motion or whether the conveyance is stopped. This is accomplished by comparing the weighted average to a minimum threshold that is programmable/adjustable. The calculated weighted averages are recorded only when the conveyance is in motion.

Functional block 2 allows for the determination of the speed of the conveyance along the Z axis 6 by integrating the calculated acceleration with the fixed time interval from functional block 1. When the conveyance is stationary, the processor may fix the speed at zero to attenuate the integration error associated with the calculation of the speed. The calculated speed may be transferred to the conveyance's display.

Functional block 3 calculates the position of the conveyance along the Z axis 7 by integrating the conveyance speed with the fixed time interval from functional block 1. When the conveyance reaches its original position 8, a position sensor sends a signal to the processor which adjusts the position to zero and thus corrects any integration error associated with calculating position. The calculated position may be transferred to the conveyance's display.

Functional block 4 records the weighted averages, speed, and position of the conveyance while traveling. When the conveyance returns to its initial position 8, the position sensor sends a signal to the processor and all recorded data is transferred to functional block 5. Data may subsequently be erased from the memory space.

Functional block 5 analyzes the impacts on the conveyance as it travels in the mine shaft. An impact caused by the conveyance on the guides corresponds to the modulus of the vector generated by the summation of the weighted accelerations along the X and Y axes. In other words, the analysis associates the impacts felt in the XY plane with the mine shaft positions and may determine abnormal impacts 9. Abnormal impacts 9 may be determined according to a statistical approach, obeying a normal distribution with a 95% confidence interval, or according to a predetermined tolerance criteria. In one implementation, all the anomalies detected (9) as well as the conditions of the transporter at the time of the impact (10) (e.g. acceleration, speed, and position in the well) are included in the impact analysis report.

The impact analysis report generated by the method may be transferred by a transmitter to the operator of the mine shaft each time the carrier reaches its reference position. The transmitter may be any transmitter known in the art, and is, preferably, a wireless transmitter. The processor executing the method can be connected to a display device and the display device can be used to display the analysis results. Alternatively, the analysis results produced by the method can be used as the basis for the generation of alarms, anomaly detection messages, and/or alarms, as well as the generation of other suitable notifications and/or alerts that can indicate any of the following: the presence of an anomaly, the presence of a vibration or anomaly that is beyond a predetermined threshold, the presence of a dangerous situation, the presence of an emergency situation, the need for emergency maintenance, the need for preventative maintenance, and the need for an emergency inspection of the conveyance or its surrounding and associated equipment. The processor may also be connected to a control unit that controls the speed of the mine conveyance in problematic areas or a control unit that can order or cause the conveyance to perform an emergency stop.

In an exemplary implementation, a system according to the present invention may generate an impact analysis report on a periodic basis, for example, every time the conveyance reaches the initial position or at set time intervals such that a report is generated every 1 hour, 30 minutes, 15 minutes, 5 minutes, etc. When abnormal impacts are identified at specific positions, a manual operation or an autopilot system may reduce the speed of the conveyance at those specific positions. Reducing speed would avoid additional undesirable damaging impacts and can thus reduce potential damage to the equipment.

In another exemplary implementation, a system according to the present invention may detect free falls, caused by accidental failure of the conveyance rope, for example a situation where there is slack in the rope. The system may be coupled with a parachute brake (for example a level-lok type system) or some other braking system that activates to cause a controlled deceleration of the conveyance upon detection of such a free fall.

In yet another exemplary implementation, a system according to the present invention may allow for optimization of mining processes in terms of time, costs, and risks management. In particular, the system may control speed as a function of the type of conveyances, as a function of what is being conveyed, i.e. human beings, mining material, ore, etc., while taking into account the results of the impact analysis reports. Such optimization would thus save time, costs and limit the risk associated with potential accidents.

EXAMPLE

A mine shaft was selected for testing the method and system of the present invention. The experiment was carried out on a mine site near Val d'Or, Quebec, Canada. The experiment was carried out in three parts, namely measurements in the conveyance, the data analysis and visual inspection in the mine shaft.

The readings were taken using an accelerometer (ICP™ from PCB Piezotronics) to measure the accelerations felt along the reference axis system as illustrated in FIG. 2 and a signal recorder (Dash 8X Data Acquisition Recorder from Astro-Med, Incorporated). The frequency of data acquisition was 100 Hz, and four (4) tests were carried out on the conveyance, the conveyance tested being a skip/cage complex. The four (4) tests were conducted as follows:

Example 1

Descent and ascent of the mining conveyance
Normal conditions
Depth: 860 m
Maximum speed: 9.144 m/s Example 2

Descent and ascent of the mining conveyance
Normal conditions
Depth: 860 m (852.7 m according to the operator's instrument)
Conveyance reset: 6.19 m above the starting point
Maximum speed: 9.144 m/s Example 3

Descent and ascent of the mining conveyance
Normal conditions:
Depth: 860 m
Conveyance reset: 0.46 m above the starting point
Speed: 4.572 m/s Example 4

Descent, emergency stop, and ascent of the mining conveyance
Emergency conditions
Depth: 450 m (449.16 m according to the operator's instrument)
Maximum speed: 9.144 m/s In a second step, the recorded data was analyzed with an analysis technique explained below. The data analysis for Example 3 was not considered due to errors. Data analysis for Examples 1, 2, and 4 identified three (3) recurring anomalies associated with three (3) approximate positions in the mine shaft. FIGS. 4 to 7 respectively provide graphs of the detected accelerations as a function of time, the speed as a function of time, travel/displacement of the mine conveyance as a function of time and detected accelerations associated with position of the mine conveyance, for each of Examples 1, 2 and 4. Table 1 shows position of the identified anomalies in the mine shaft resulting from data analysis of detected accelerations in Examples 1, 2 and 4.

TABLE 1

Recurrent anomalies identified

| | Anomalies detected by data analysis | | |
|---|---|---|---|
| Position (in m) | 1 | 2 | 3 |
| Example #1 | 120 | 190 | 340 |
| Example #2 | 112 | 186 | 327 |
| Example #4 | 108 | 193 | 336 |
| Average position | 113.3 | 186 | 334 |

Figure 9A:
FIGS. 9A and 9B are photographs of identified anomalies in a mine shaft according to exemplary embodiments of the present invention.
Figure 9B:
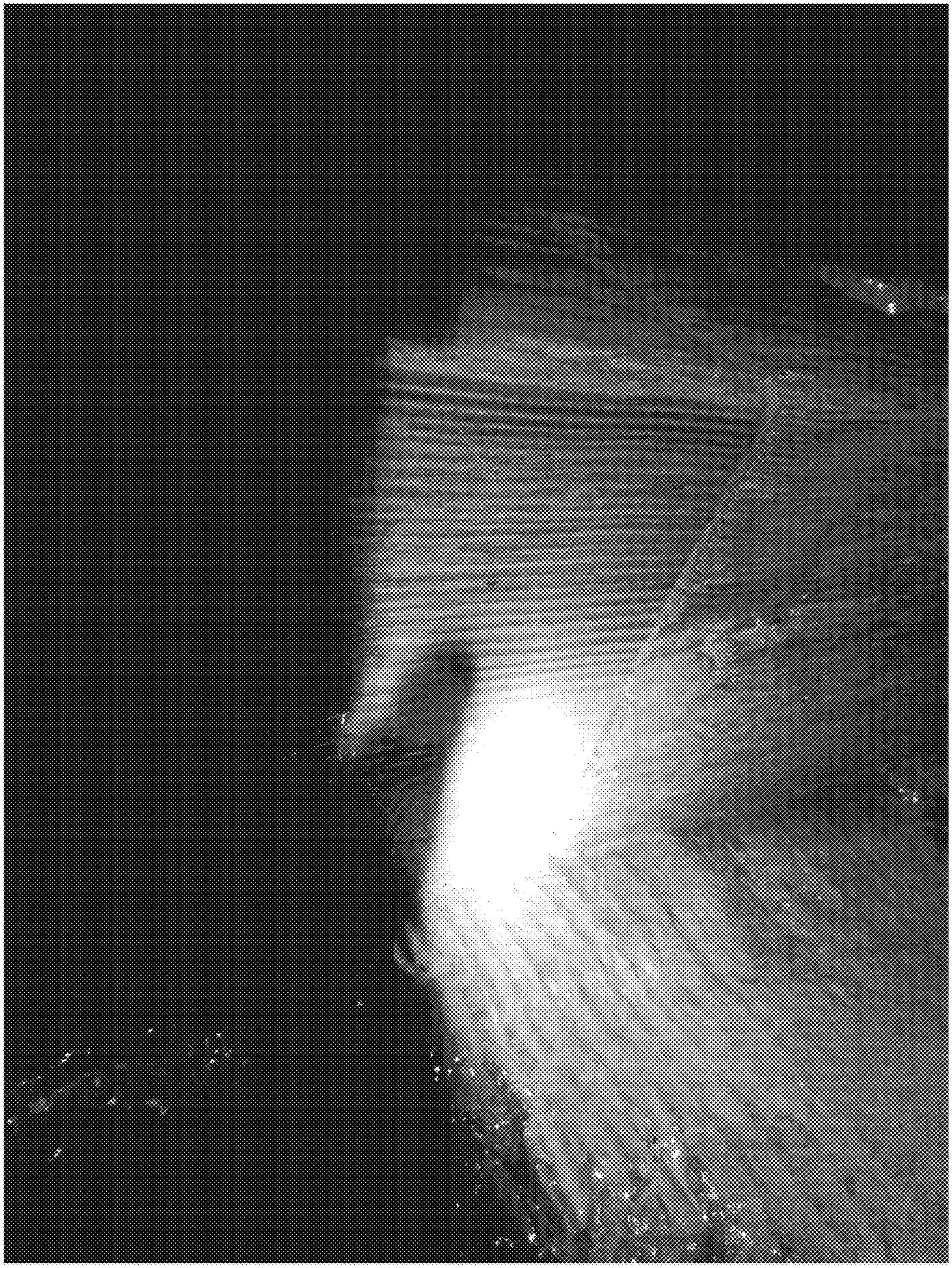

As a third stage of the verification, a visual inspection was conducted to corroborate the results. The inspection allowed for the visual confirmation of two (2) anomalies in the three (3) positions determined by the data analysis. FIGS. 9A and 9B show the anomalies observed during visual inspection at 190 m and 108 m respectively, in accordance with the position measured by the position indicator of the skip/cage conveyance.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for monitoring movements of at least one mining conveyance in a mine shaft for identifying anomalies, the at least one mining conveyance being vertically displaceable along guides in the mine shaft, the method comprising:

i. providing the at least one mining conveyance with at least one sensor for detecting movements, said at least one sensor being mounted to said at least one mining conveyance;

ii. operating the at least one mining conveyance upwardly and downwardly along the guides;

iii. detecting movements with the at least one sensor to generate a signal; and iv. analyzing the signal as a function of position of the mining conveyance on the guides for identification of an anomaly at a specific position, wherein said at least one sensor measures acceleration along a plane perpendicular to a direction of motion of said at least one mining conveyance to thereby produce acceleration data, and wherein said processor associates said acceleration data with said specific position to thereby identify said anomalies.

2. The method of claim 1, wherein the method is for continuous monitoring during the movements of the at least one mining conveyance.

3. The method of claim 1, wherein the at least one mining conveyance is one of: a service cage, an auxiliary cage, a skip, and a counter-weight.

4. The method of claim 1, further comprising transmitting the signal to a processor for analyzing the signal as a function of position of the mining conveyance on the guides for identification of an anomaly at a specific position.

5. The method of claim 4, wherein the signal is transmitted wirelessly.

6. The method of claim 1, wherein the analysis is conducted in real-time.

7. The method of claim 1, further comprising generating an alarm when an anomaly is identified.

8. A system for monitoring movements of at least one mining conveyance in a mine shaft for identifying anomalies, the at least one mining conveyance being vertically displaceable along guides in the mine shaft, the system comprising:

a) at least one sensor provided on the at least one mining conveyance for detecting movements and generating at least one signal based on said movements; and b) a processor for analyzing the at least one signal and identifying an anomaly as a function of a specific position of the at least one mining conveyance on the guides, wherein said at least one sensor is configured to measure acceleration along a plane perpendicular to a direction of motion of said at least one mining conveyance to thereby produce acceleration data, and wherein said processor is configured to associate said acceleration data with said specific position to thereby identify said anomalies.

9. The system of claim 8, further comprising a transmitter for transmitting the at least one signal from the at least one sensor to the processor.

10. The system of claim 8, further comprising a display for displaying analysis data from the processor.

11. The system of claim 9, wherein the display generates an alarm when the anomaly is identified.

12. The system of claim 8, wherein the at least one mining conveyance is one of: a service cage, an auxiliary cage, a skip, and a counter-weight.

13. The system of claim 9, wherein the transmitter transmits the signal wirelessly.

14. The system of claim 8, wherein the system is used in executing a method comprising the steps of:

i. detecting movements of the at least one mining conveyance operating upwardly and downwardly along the guides with the at least one sensor to generate a signal;

ii. analyzing, with the processor, the signal as a function of position of the mining conveyance on the guides for identification of an anomaly at a specific position.

* * * * *